(12) United States Patent
Simonyi

US007237226B2

(10) Patent No.: US 7,237,226 B2
(45) Date of Patent: Jun. 26, 2007

(54) METHOD AND SYSTEM FOR STORING PENDING CHANGES TO DATA

(75) Inventor: Charles Simonyi, Medina, WA (US)

(73) Assignee: Intentional Software Corporation, Bellevue, WA (US)

( * ) Notice: Subject to any disclaimer, the term of this patent is extended or adjusted under 35 U.S.C. 154(b) by 654 days.

(21) Appl. No.: 10/435,497

(22) Filed: May 9, 2003

(65) Prior Publication Data

US 2004/0225964 A1 Nov. 11, 2004

(51) Int. Cl.
  *G06F 9/44* (2006.01)
  *G06F 9/45* (2006.01)
(52) U.S. Cl. .................... 717/110; 717/120; 717/141
(58) Field of Classification Search ...................... None
  See application file for complete search history.

(56) References Cited

U.S. PATENT DOCUMENTS

| | | | |
|---|---|---|---|
| 5,493,678 A | | 2/1996 | Arcuri et al. |
| 5,557,730 A | * | 9/1996 | Frid-Nielsen ............... 715/839 |
| 5,748,975 A | | 5/1998 | Van De Vanter |
| 5,752,058 A | | 5/1998 | Van De Vanter |
| 5,790,863 A | | 8/1998 | Simonyi |
| 5,813,019 A | | 9/1998 | Van De Vanter |
| 5,857,212 A | | 1/1999 | Van De Vanter |
| 5,907,705 A | | 5/1999 | Carter |
| 6,097,888 A | | 8/2000 | Simonyi |
| 6,275,223 B1 | | 8/2001 | Hughes |
| 6,305,008 B1 | * | 10/2001 | Vaidyanathan et al. ..... 717/111 |
| 6,314,559 B1 | * | 11/2001 | Sollich ........................ 717/111 |
| 2002/0010713 A1 | | 1/2002 | Egilsson |
| 2002/0023257 A1 | | 2/2002 | Charisius et al. |
| 2003/0149961 A1 | * | 8/2003 | Kawai et al. ................ 717/129 |

OTHER PUBLICATIONS

IBM, Using SQL String to Store Pending Changes, Display Changes, Allow Cancellation of Changes Without Modifying Database Until Changes Are Committed, May 5, 2002, IP.com, IPCOM000015201D.*
Plotkin, David, "Alice-The Personal Pascal—First Interpreted ST Pascal," ANTIC, vol. 6, No. 2, Jun. 1987 (6 pages) http://www.atarimagazines.com/v6n2/Alice.html.
Rational XDE—Extend Your Development Experience (1 page) http://www.rational.com/products/xde/?SMSESSION=NO [Accessed Sep. 4, 2003].
Welcome to Squeak (1 page) http://www.squeak.org/ [Accessed Sep. 4, 2003].

* cited by examiner

*Primary Examiner*—Antony Nguyen-Ba
(74) *Attorney, Agent, or Firm*—Perkins Coie LLP

(57) ABSTRACT

A method and system for storing pending changes to data having a data model is provided. In one embodiment, a pending change system receives a change that is to be made to the data. When the change is "committed," the change system determines whether the change to the data will result in changed data that is consistent with the data model. When the change system determines that the change is consistent, it updates the data accordingly. If, however, a change is not committed or committed but inconsistent, the change system stores the change in a pending change list associated with the data.

68 Claims, 11 Drawing Sheets

```
a = b + c
if(a > 10)
{a = a - 5
 b = b - 5
}
```

```
a = b + c
if(a >
{a = a - 5
 b = b - 5
}
```

Edit

FIG. 7

METHOD AND SYSTEM FOR STORING PENDING CHANGES TO DATA

TECHNICAL FIELD

The present invention relates generally to a computer method and system for generating a computer program.

BACKGROUND

Computer programs are generally written in a high-level programming language (e.g. the JAVA programming language or C). Compilers are then used to translate the instructions of the high-level programming language into machine instructions, which can be executed by a computer. The compilation process is generally divided into 6 phases: 1. Lexical analysis 2. Syntactic analysis 3. Semantic analysis 4. Intermediate code generation 5. Code optimization 6. Final code generation.

During lexical analysis, the source code of the computer program is scanned and components or tokens of the high-level language are identified. The compiler converts the source code into a series of tokens that are processed during syntactic analysis. For example, during lexical analysis, the compiler would identify the statement cTable=1.0;

as the variable (cTable), the operator (=), the constant (1.0), and a semicolon. A variable, operator, constant, and semicolon are tokens of the high-level language.

During syntactic analysis (also referred to as "parsing"), the compiler processes the tokens and generates a syntax tree to represent the program based on the syntax (also referred to as "grammar") of the programming language. A syntax tree is a tree structure in which operators are represented by non-leaf nodes and their operands are represented by child nodes. In the above example, the operator ("=") has two operands: the variable (ctable) and the constant (1.0). The term "parse tree" and "syntax tree" are used interchangeably in this description to refer to the syntax-based tree generated as a result of syntactic analysis. For example, such a tree may optionally describe the derivation of the syntactic structure of the computer program (e.g., may describe that a certain token is an identifier, which is an expression as defined by the syntax). Syntax-based trees may also be referred to as "concrete syntax trees," when the derivation of the syntactic structure is included, and as "abstract syntax trees," when the derivation is not included.

During semantic analysis, the compiler modifies the syntax tree to ensure semantic correctness. For example, if the variable (ctable) is an integer and the constant (1.0) is floating point, then during semantic analysis a floating point to integer conversion would be added to the syntax tree.

During intermediate code generation, code optimization, and final code generation, the compiler generates machine instructions to implement the program represented by the syntax tree. The machine instructions can then be executed by the computer.

To develop a computer program, a programmer typically uses a text-based editor to specify letters, numbers, and other characters that make up the source code for the computer program. The text-based editor may store these characters in the source code file using an ASCII format and delimiting each line by an end-of-line character. After the source code file is created, the programmer runs a compiler to compile the source code into the corresponding object code for the computer program. As the compiler proceeds through its lexical analysis, syntactic analysis, and semantic analysis phases using the source code as input, it may detect an error in the source code. If the programmer has specified a syntactically incorrect statement in the source code, then the compiler may stop its compilation and output an indication of the incorrect statement. For example, the syntax may specify that "==" is the "equal to" operator, but the programmer may have inadvertently used "=", which may be the "assignment" operator, where the equal to operator should have been used. Once the programmer is notified of the error, the programmer would use the text-based editor to correct the error and recompile the source code. However, since compiler error messages are often ambiguous, the fix to the error may not be correct. As a result, the programmer may need to repeat this cycle of editing and compiling the source code many times until the error is fixed. To reduce the number of cycles, some text-based editors perform syntactic analysis as the text is being entered by the programmer and alert the programmer when an error is detected. Such text-based editors are referred to as "eager parsing" editors. They improve the speed with which the programmer gets feedback on errors in the code. However, they do not address the root of the problem: the admission of incorrect edits and the difficulty of making correct structure-based edits.

Structured editors, also known as syntax-driven editors, address the root of the problem of text-based editors by assisting programmers in the correct specification and manipulation of the source code for a computer program. In addition to performing the functions of a text-based editor, a structured editor may perform lexical and syntactic analysis as the source code is being entered by the programmer. A structured editor typically maintains a hierarchical representation of the source code based on the hierarchy of the programming language syntax. This hierarchical representation may be a syntax tree. As a programmer enters the characters of the source code, the structured editor may perform lexical and syntactic analysis. If the structured editor detects a lexical or syntactic error, it typically notifies the programmer and requires correction before the programmer can continue entering the source code. For example, if a programmer entered the assignment operator, rather than the equal operator, the structured editor would require the programmer to immediately correct the error. As a result, the syntactic structure of source code generated by a structured editor is inherently correct.

"lightweight structured editor" addresses some of the problems of structured editors, while maintaining some of their advantages. A lightweight structured editor allows text to be manipulated like a text-based editor, but it can also allow some forms of structured editing. Although the source code is stored as plain text, the editor allows selection and editing based on the underlying syntax. For example, an entire "for" loop can be selected with a single selection command (e.g., double clicking on the "for"). Also, when a user renames a method, the editor can automatically rename all the references to that method.

A system has been described for generating and maintaining a computer program represented as an intentional program tree, which is a type of syntax tree. (For example, U.S. Pat. No. 5,790,863 entitled "Method and System for Generating and Displaying a Computer Program" and U.S. Pat. No. 6,097,888 entitled "Method and System for Reducing an Intentional Program Tree Represented by High-Level Computational Constructs," which are hereby incorporated by reference.) The system provides a mechanism for directly manipulating nodes corresponding to syntactic elements by adding, deleting, and moving the nodes within an intentional program tree. An intentional program tree is one type of "program tree." A "program tree" is a tree representation of a computer program that includes operator nodes and operand nodes. A program tree may also include inter-node references (i.e., graph structures linking nodes in the tree), such as a reference from a declaration node of an identifier to the node that defines that identifier's type. An abstract syntax tree and a concrete syntax tree are examples of a program tree. Once a program tree is generated, the system performs the steps of semantic analysis, intermediate code generation, code optimization, and final code generation to effect the transformation of the computer program represented by the program tree into executable code.

That system also provides editing facilities. The programmer can issue commands for selecting a portion of a program tree, for placing an insertion point in the program tree, and for selecting a type of node to insert at the insertion point. The system allows various commands to be performed relative to the currently selected portion and the current insertion point. For example, the currently selected portion can be copied or cut to a clipboard. The contents of the clipboard can then be pasted from the clipboard to the current insertion point using a paste command. Also, the system provides various commands (e.g., "Paste=") to insert a new node (e.g., representing an assignment operator) at the current insertion point.

The system displays the program tree to a programmer by generating a display representation of the program tree. A display representation format specifies the visual representation (e.g., textual) of each type of node that may be inserted in a program tree. The system may support display representation formats for several popular programming languages, such as C, the JAVA programming language, Basic, and Lisp. This permits a programmer to select, and change at any time, the display representation format that the system uses to produce a display representation of a program tree. For example, one programmer can select to view a particular program tree in a C display representation format, and another programmer can select to view the same program tree in a Lisp display representation format. Also, one programmer can switch between a C display representation format and a Lisp display representation format for a program tree.

The system also indicates the currently selected portion of the program tree to a programmer by highlighting the corresponding display representation of the program tree. Similarly, the system indicates the current insertion point to a programmer by displaying an insertion point mark (e.g., "I" or "^") within the displayed representation. The system also allows the programmer to select a new current portion or re-position the insertion point based on the display representation.

Structured editors and eager-parsing editors both have advantages and disadvantages. Structured editors allow source code to be selected and modified on a syntactic-element basis. For example, a structured editor may allow a programmer to select an identifier, the expression that contains the identifier (e.g., the identifier, binary operator, and the other operand), the statement that contains the expression, and the procedure that contains the statement. For example, given the following source code:

void foo () {a=b+10;} a structured editor would allow the selection of the identifier "b," the selection of the expression "b+10," the selection of the statement "a=b+10," or the selection of the entire "foo" procedure. The structured editor might not allow the programmer to select only a portion of the procedure that includes only one of the braces because that would be an incomplete syntactic element. For example, a typical structured editor would not allow the selection of "b+10;}", since that selection does not have a clear structural meaning. Although eager-parsing editors allow for the selection of such incomplete syntactic elements, they do not allow for easy selection on syntactic-element basis.

Structured editors have not been widely adopted. This lack of adoption results primarily from the difficulty in use caused by enforcing the modification of source code on a syntactic element basis. There are also other factors that have precluded their adoption. Non-syntactic manipulation is difficult (e.g., turning an "if" statement into a "while" loop.) They require a sequence of actions which can make editing expressions tedious. Also, programs need to be created top-down, which makes prototyping difficult (e.g., having to write a method before writing a call to the method). Because an eager-parsing editor does not have this difficulty, programmers typically prefer to develop computer programs using eager-parsing editors. Nevertheless, programmers would like to sometimes edit the source code on a syntactic-element basis because there are significant advantages to such editing. For example, with such editing, programs are inherently syntactically correct, and editing operations have the semantics of the underlying language, rather than a text editing semantics. The lack of adoption of structured editors also results from the difficulty in entering new portions to be added to the source code because of the rigid adherence to syntactic correctness at the time of entry, which goes against the free flowing order of the programmer's work. Lightweight structured editors, on the other hand, offer only limited structured editing facilities. Therefore, it would be desirable to have a development environment that would allow the flexibility of a text-based editor while allowing the selection and entry of source code on a syntactic element basis as provided by a structured editor.

BRIEF DESCRIPTION OF THE DRAWINGS

FIG. 7 is a block diagram illustrating a modification to example source code.

DETAILED DESCRIPTION

Figure 1:
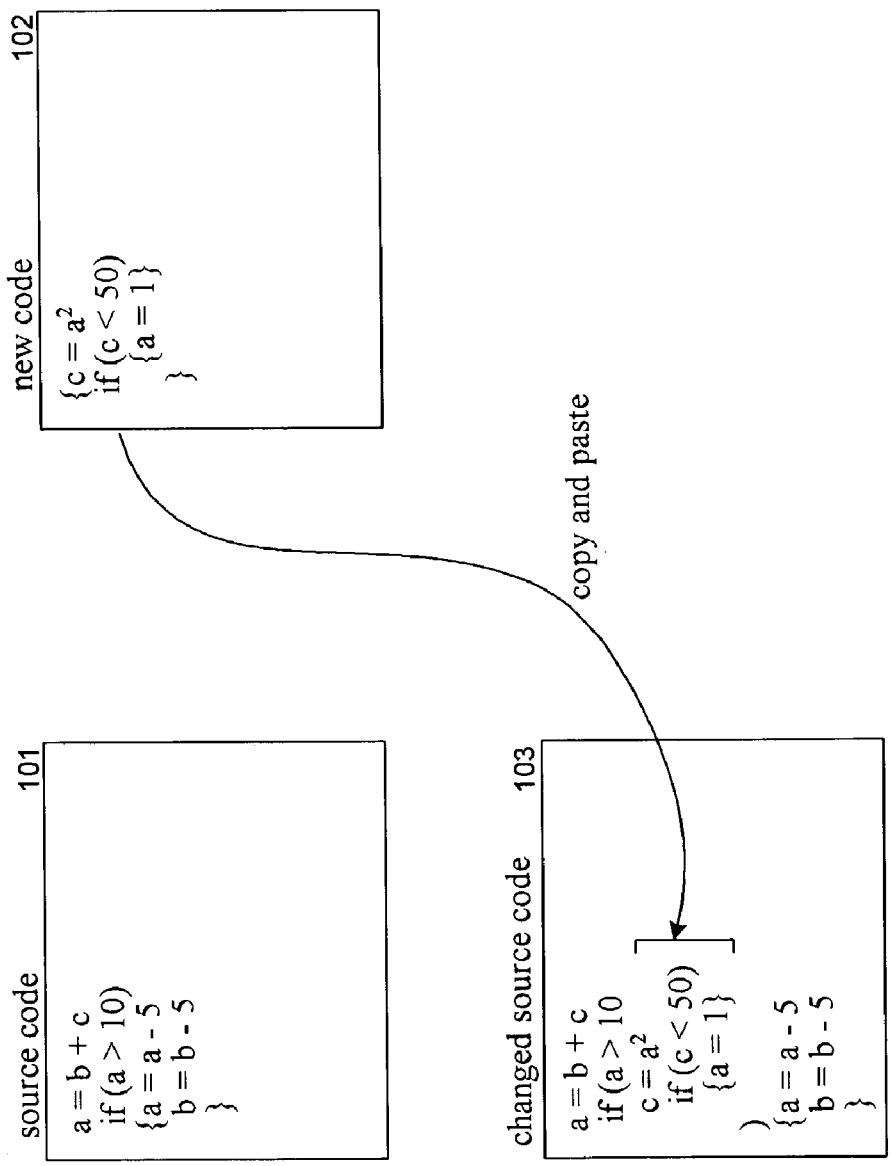
FIG. 1 is a block diagram illustrating an inconsistent change to example source code.

A method and system for storing pending changes to data having a data model is provided. As described below, the method and system may be used in a program development environment to provide advantages of both text-based editors and structured editors. In one embodiment, a pending change system receives a change that is to be made to data. When the change is "committed," the change system determines whether the change to the data will result in data that is consistent with or conforming to a given data model. For example, if the data is source code for a computer program, then the change will be consistent with the data model (e.g., syntax of the programming language) when the change will result in source code that is syntactically correct. When the change system determines that the change is consistent, it updates the data accordingly. If, however, a change is not committed or committed but inconsistent, the change system stores the change in a pending change data structure associated with the data. A change that has been committed and is consistent with the data model is referred to as a "recognized change" or an "accepted change." A change that has not yet been committed or that has been committed but is inconsistent is referred to as an "unrecognized change" or a "pending change." For example, if the change is to add to the source code a statement that is valid in the current program context, then before being committed the change is unrecognized and after being committed the change is recognized. If the change is to add a statement that is invalid in the current context, however, then the change is unrecognized whether or not it was committed. By storing pending changes in a pending change list, the change system preserves the consistency of the data, but allows the changes, whether consistent within their program context or not, to be tracked. This enables a change to be displayed in a locally valid way, even if it is invalid in the context to which it was added. As such, the change is displayed in a protective pending context. When the data is later displayed, the change system can examine the pending change list and display an indication of the pending changes along with the data. So, for example, the display may list source code with the invalid statement inserted as indicated by a pending change. The change system can allow a user to at any time correct an inconsistent change or to commit the pending change so that the change can be recognized. A pending change that is inconsistent may become consistent due to a change in the data that is separate from the pending change. The result is "modeless" editing, which in contrast to modal editing, does not force the user to enter a restrictive mode until a change is made consistent. Modal editing is undesirable because it can break the work flow by forcing the user to make a change at a time earlier than might be desired by the user. For example, a statement may be invalid because it declares an identifier to have a certain type that has not yet been defined. If a statement is later added that defines that type, the pending change becomes consistent without modifying the pending change itself. In this way, the change system can ensure that the consistency of the data is maintained, while tracking pending changes that may be inconsistent so that the changes can be corrected later.

In one embodiment, the pending change system is implemented as part of a program development environment that uses techniques typically associated with structured editors and other techniques typically associated with text-based editors. Thus, the program development environment combines advantages of structured editors (e.g., semantic element selection) and text-based editors (e.g., flexible order entry such as "use before definition"), but minimizes the disadvantages of structured editors and text-based editors. Because the pending change-system allows for the storing of changes that are not syntactically correct, a programmer can indicate a change to source code that makes it syntactically incorrect and have that change saved for later display and correction, rather than being forced to correct it immediately.

The pending change system can associate pending changes with the underlying data in many ways. For example, if the data is source code stored in a source code file in a non-structured manner, then the pending change list might be appended, with sufficient separations, to the end of the file. As another example, if the source code is stored in a program tree, then the pending change list can be stored as a node of the program tree with a child node representing each pending change. Each pending change may specify the type of change (e.g., insertion), the portion of the data to which the change applies (e.g., insertion point), and the substance of the change (e.g., text to be inserted). When the pending change system displays the data, it can also display an indication of the pending changes. A user can select to display either the data by itself or the data as modified by the pending changes. When the data is source code, the pending change system may simply display text whose insertion is pending at its insertion point within the source code or not display portions of the source code whose deletion is pending.

The pending change system can be used in many environments other than conventional program development environments. Such environments may maintain Extensible Markup Language ("XML") documents, Universal Modeling Language ("UML") models, data stored in a database, and so on. When used in an XML environment, the change system may use an XML schema as the data model and track pending changes in an XML document. When used in the UML environment, the change system can use UML notations and semantics defined by the UML standards specification as the data for the UML model. When used in a database environment, the change system may use the database schema and additional validation rules as the data model. As a user starts to make changes to the database, the change system may store the changes that have not yet committed or are inconsistent in a change table. The change table identifies the database tables to be changed, the type of change, the new data, and so on. The pending change system is independent of the notation used for specifying the change. For example, when editing a computer program, the changes may be specified using text manipulation, and when editing a UML model, the changes may be specified using graphic notations.

To facilitate the editing of data, the pending change system may convert data stored in a structured manner to unstructured data so that it can be manipulated by a user in an unstructured manner. For example, if source code is stored in a program tree, a user may select a statement to edit in an unstructured manner. The change system would generate the text corresponding to the statement and allow the user to edit the text using conventional text-based editor techniques. The change system may add an entry to the pending change list that indicates to replace the selected statement with the modified text. When the change is eventually recognized, the pending change system can update the program tree and remove the entry from the pending change list. This facility is referred to as "liquefaction," and is used when the user wants to make an edit using traditional text and character manipulation (where the text would not be recognized by the environment of the edit while the manipulation is taking place) that is not correct in the current context of the program tree (e.g., when adding statements based on types that have not yet been defined). The edit is wrapped in the "protective" pending context. For a pending edit that is incorrect in the current context, it is possible to switch back and forth between the structured and the pending text. The pending change system can be used to create new portions of the source code, rather than simply edit or move existing portions. A new portion can be entered and before being committed it is stored in the pending list, whether or not the portion is valid in its current context. That portion can be modified as desired and then committed. If valid when committed, the new portion is added to the source code. If invalid, the change remains on the pending list.

FIG. 1 is a block diagram illustrating an inconsistent change to example source code. Block 101 illustrates the source code that is to be changed. Block 102 contains the new code that is to be inserted into the source code. The source code and new code may be stored in separate files. To effect the change, a user may select the new code and paste it into the source code. As shown in block 103, the user has selected to insert the new code before the closing parenthesis of the condition (i.e., "(a>10)") of the "if" statement. The insertion of the new code at this insertion point would result in source code that is syntactically incorrect. A conventional structured editor does not allow the insertion of new code, since it forces the user to insert structurally (syntactically) correct nodes. The change system, in contrast, does not require the programmer to correct the source code at that time. Rather, the change system maintains an unchanged copy of the source code, which is syntactically correct, and stores an indication of the pending change in the pending change list associated with the source code in a persistent manner. When the programmer later displays the source code, the source code along with the pending change can be displayed as shown in block 103. At that point, the change system gives the programmer an option to correct and commit the change, to leave it as pending, or to undo the change after realizing a mistake. This is better than what current structured editors do by refusing the change, since even when a change is not correct allowing it preserves the information of the user's intention, facilitating a future fix.

Figure 2:
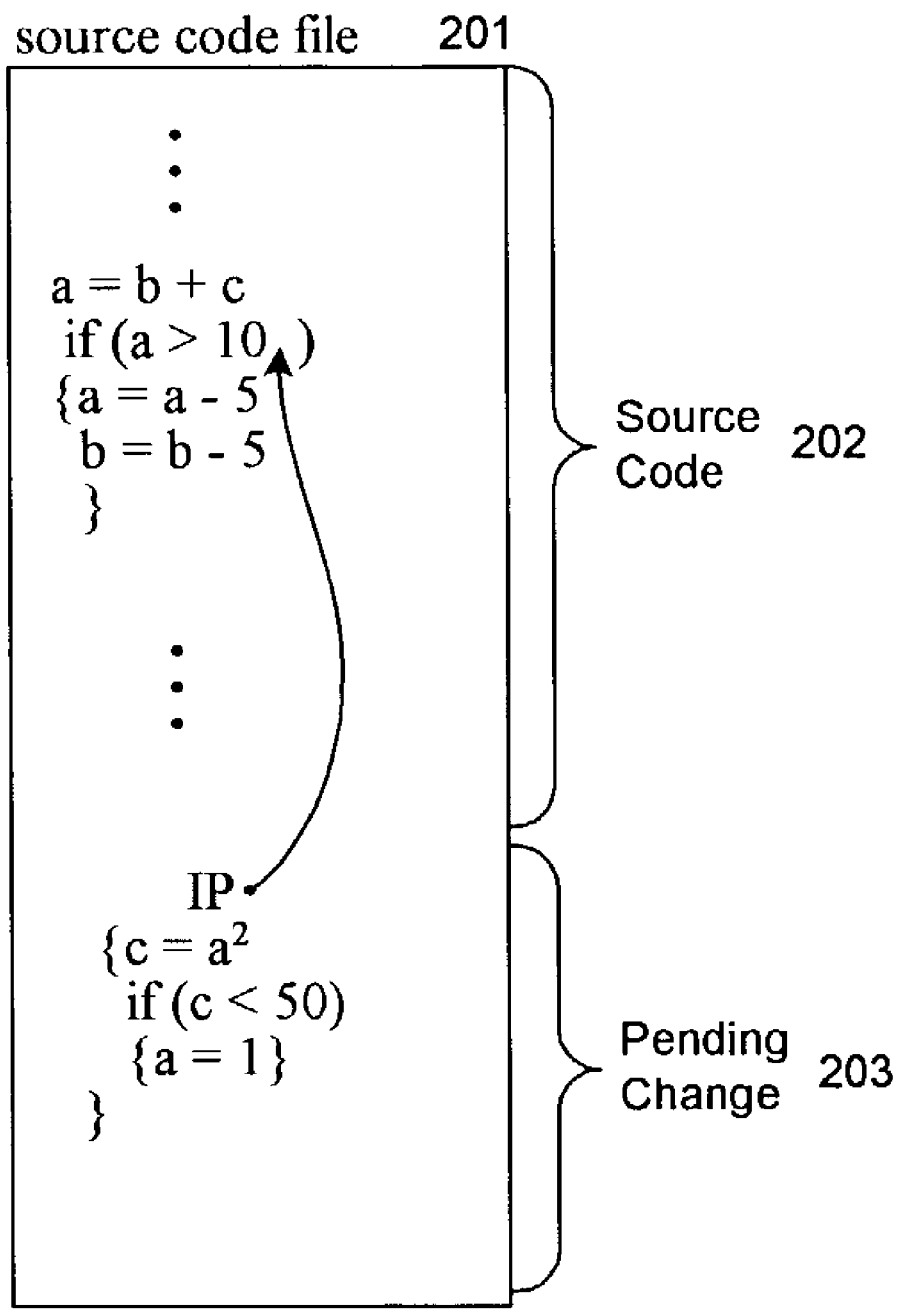
FIG. 2 is a block diagram illustrating an example layout of a file that contains source code and a pending change list.

FIG. 2 is a block diagram illustrating an example layout of a file that contains source code and a pending change list. The source code file 201 contains the source code 202 stored as text and the pending change list 203. Alternatively, the source code could be stored using a program tree or some other structured means. The source code could also be stored in the source code file both as text and as a program tree. The pending change list contains the pending change that is represented by the insertion point within the source code along with the new code to be inserted. The new code can be stored as text or in some other way. For example, if the new code itself was syntactically correct, then it could be stored as a program tree.

A pending change list can have multiple entries with each entry representing a different pending change. Each pending change entry contains information that describes the pending change. A pending change can be categorized as an insertion, a deletion, or a replacement. A replacement could be represented as two pending changes, that is a deletion of the source code to be modified and an insertion of the modified source code as new code. Each pending change entry may include a change type (e.g., insertion or deletion). An entry for a deletion may identify the range to be deleted, and an entry for an insertion may identify the insertion point and the data to be inserted. The pending changes can be represented in other ways. For example, an insertion could be represented by storing information at the insertion point itself (e.g., a pending change node stored within a program tree). The pending changes can also be stored in various types of data structures such as a table, a linked list, a tree, and so on.

Figure 3:
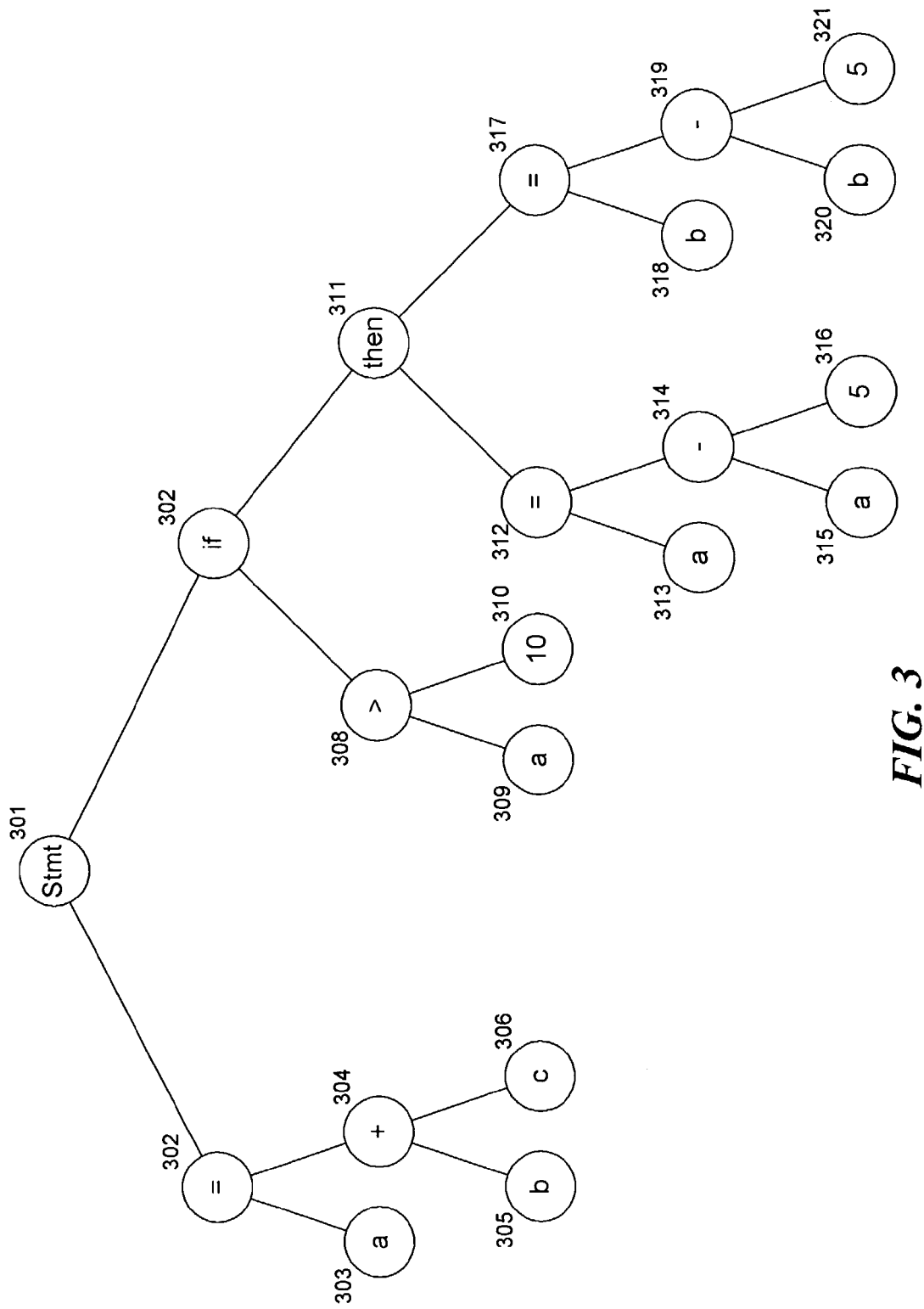
FIG. 3 is a diagram illustrating a program tree representation of example source code.
Figure 4:
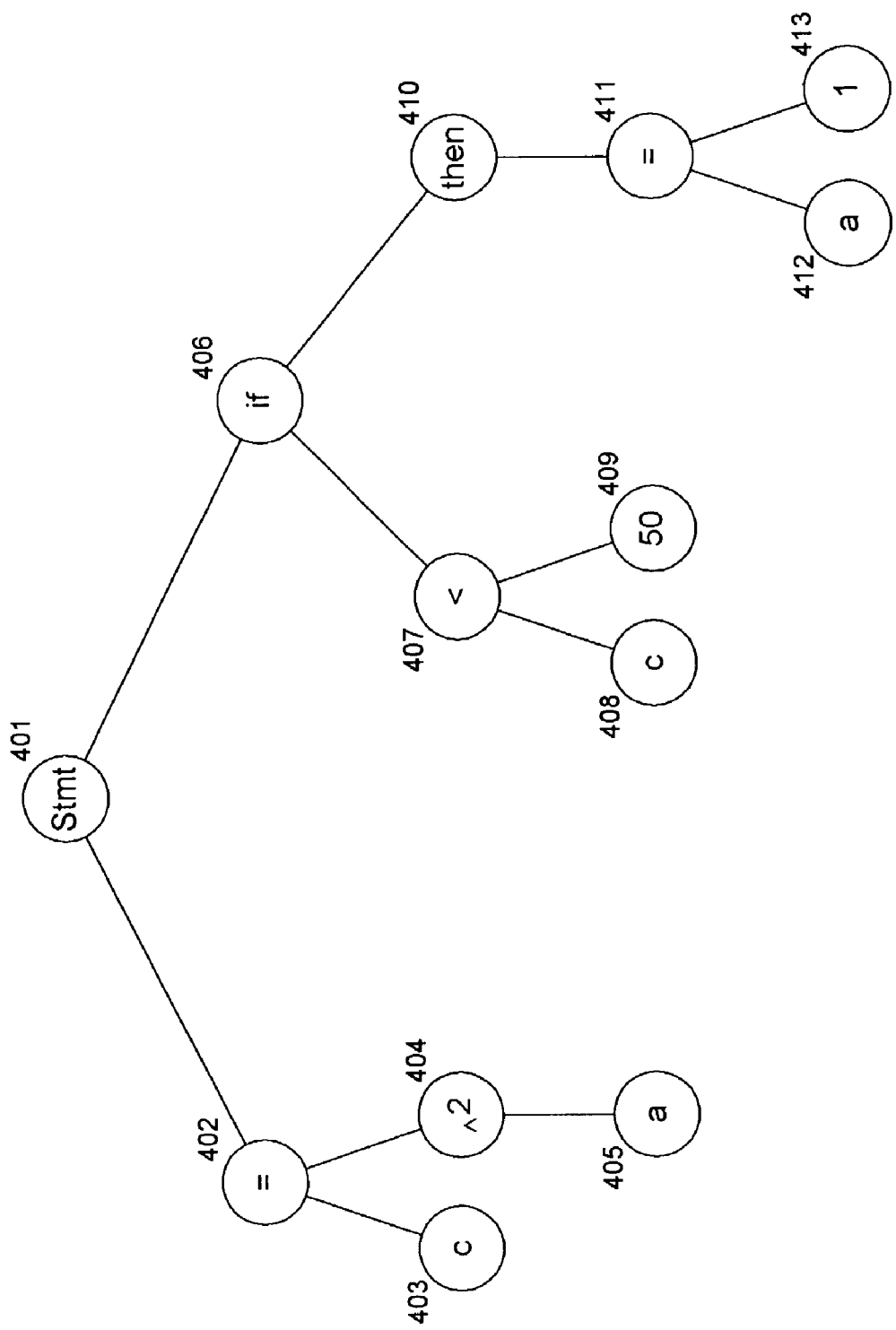
FIG. 4 is a diagram illustrating a program tree representation of example new code.

FIG. 3 is a diagram illustrating a program tree representation of example source code. The source code corresponds to the source code of FIG. 1. Each non-leaf node represents an operator, and each child node represents the operands of the operator. Node 301 represents a statement aggregation operator, and nodes 302 and 307 represent operands of the statement aggregation operator. Node 302 represents the assignment operator, and nodes 303 and 304 represent its operands. Node 303 represents the variable "a," and node 304 represents the addition operator of an expression. Nodes 305 and 306 represent the operands of node 304. Node 305 represents the variable "b," and node 306 represents the variable "c." Nodes 307-321 similarly represent the operators and operands associated with the "if" statement of node 307. FIG. 4 is a diagram illustrating a program tree representation of example new code. The new code corresponds to the new code of FIG. 1. Nodes 401-413 represent the operators and operands of the new code.

Figure 5:
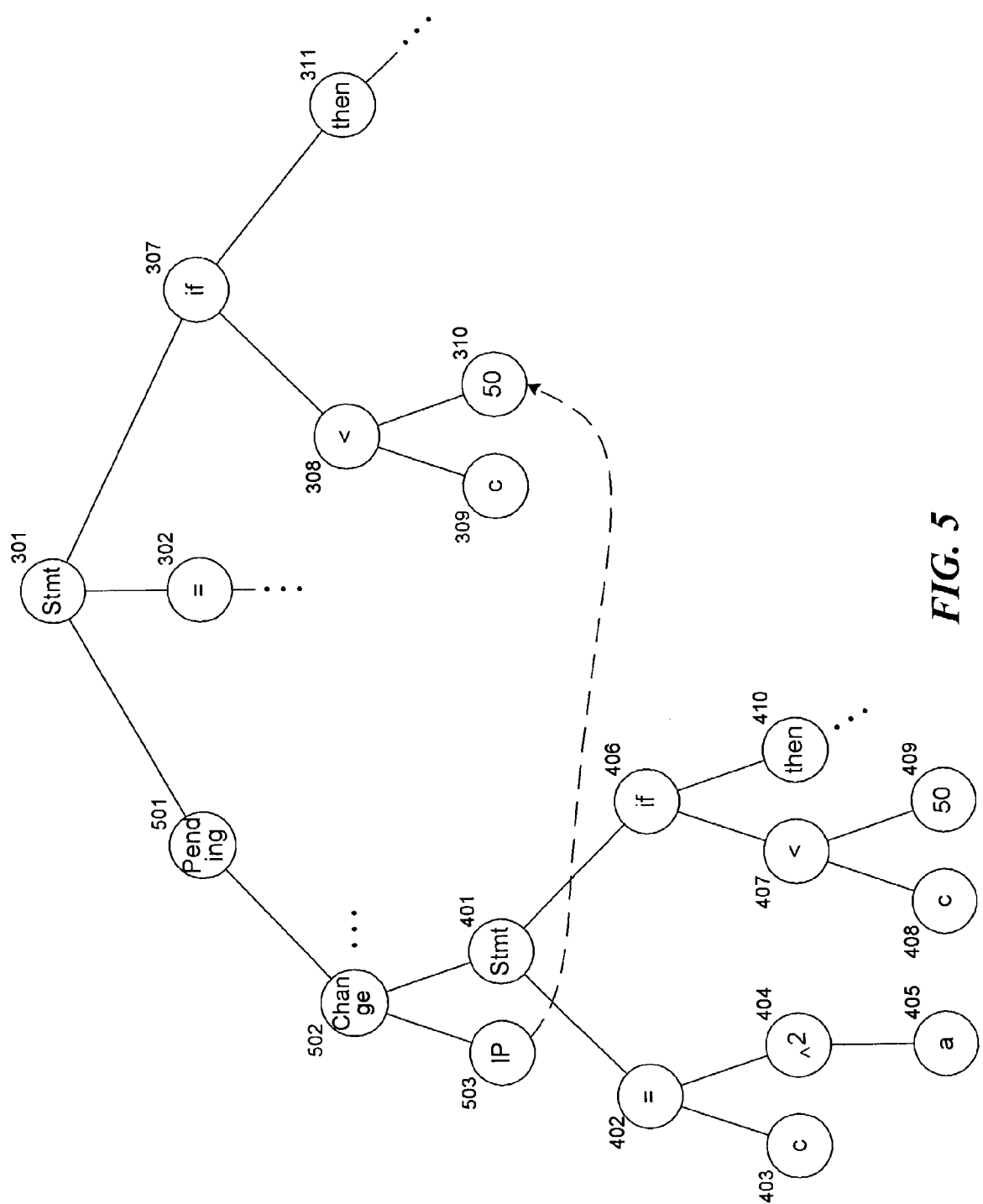
FIG. 5 is a diagram illustrating a program tree of example source code along with a pending change data structure in one embodiment.
Figure 6:
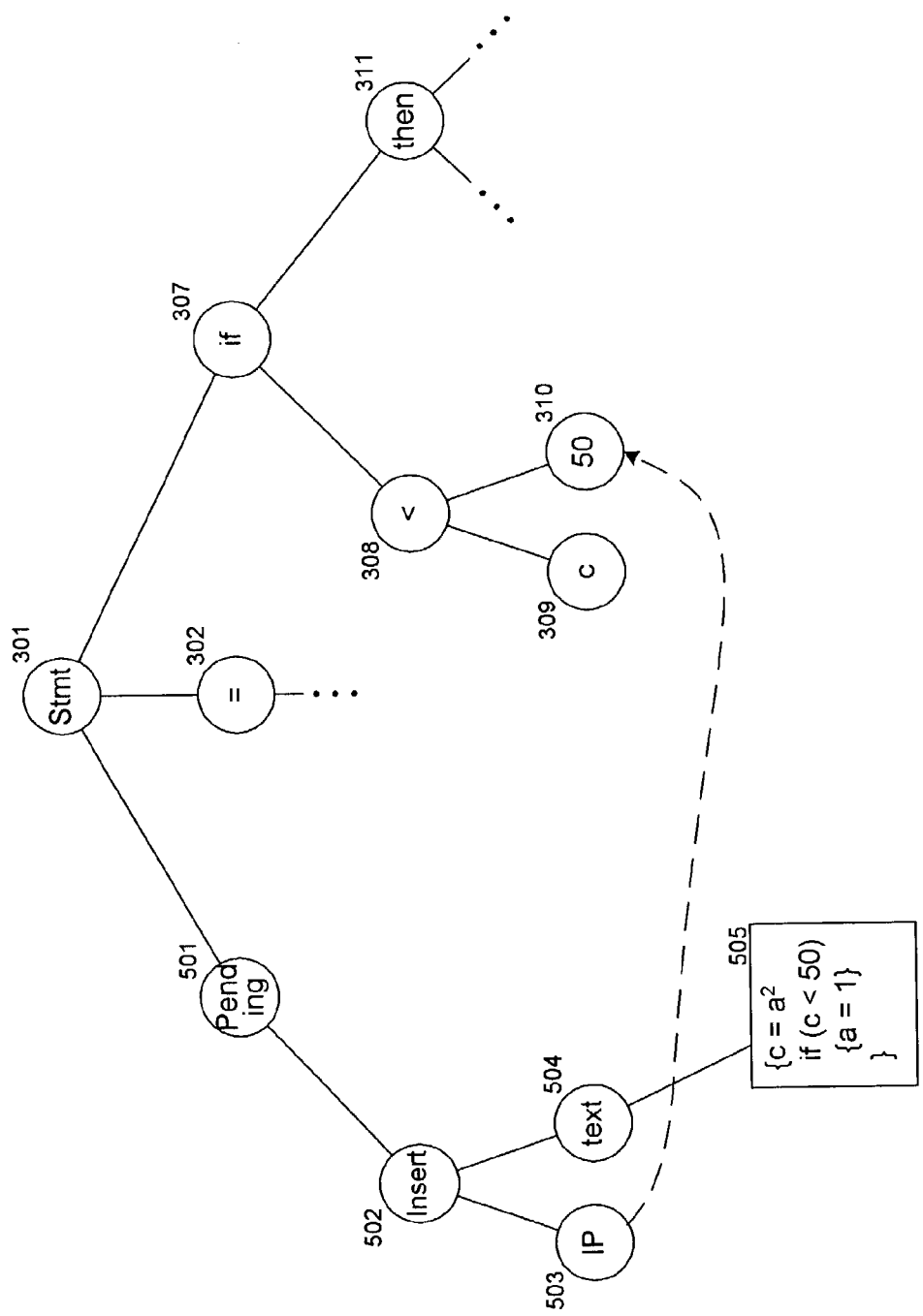
FIG. 6 is a diagram illustrating a program tree of example source code along with a pending change list in another embodiment.

FIG. 5 is a diagram illustrating a program tree of example source code along with a pending change data structure in one embodiment. The source code corresponds to the source code of FIG. 3, and the change corresponds to the insertion of the new code of FIG. 4. Nodes 301-321 represent the unchanged source code. Node 501 represents the pending change data structure. Node 501 may have a child node for each pending change. In this example, node 502 is the only child node because only one change is pending. Node 502 indicates that the change type is an insertion, which may be stored as an attribute of the node. Child nodes 503 and 401 are the operand nodes of the change "operator." Node 503 points to the insertion point within the source code (i.e., after node 310). Nodes 401-413 represent the new code to be inserted. FIG. 6 is a diagram illustrating a program tree of example source code along with a pending change list in another embodiment. In this example, the new code is stored as text, rather than as a program tree, as indicated by node 504 and block 505, in contrast to nodes 401-413 of FIG. 5.

Figure 7:
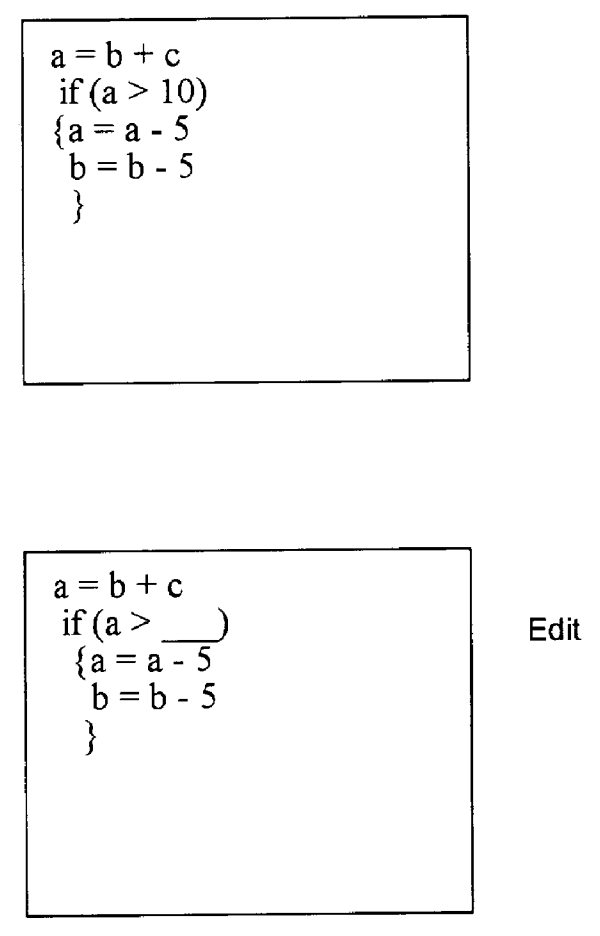
Figure 8:
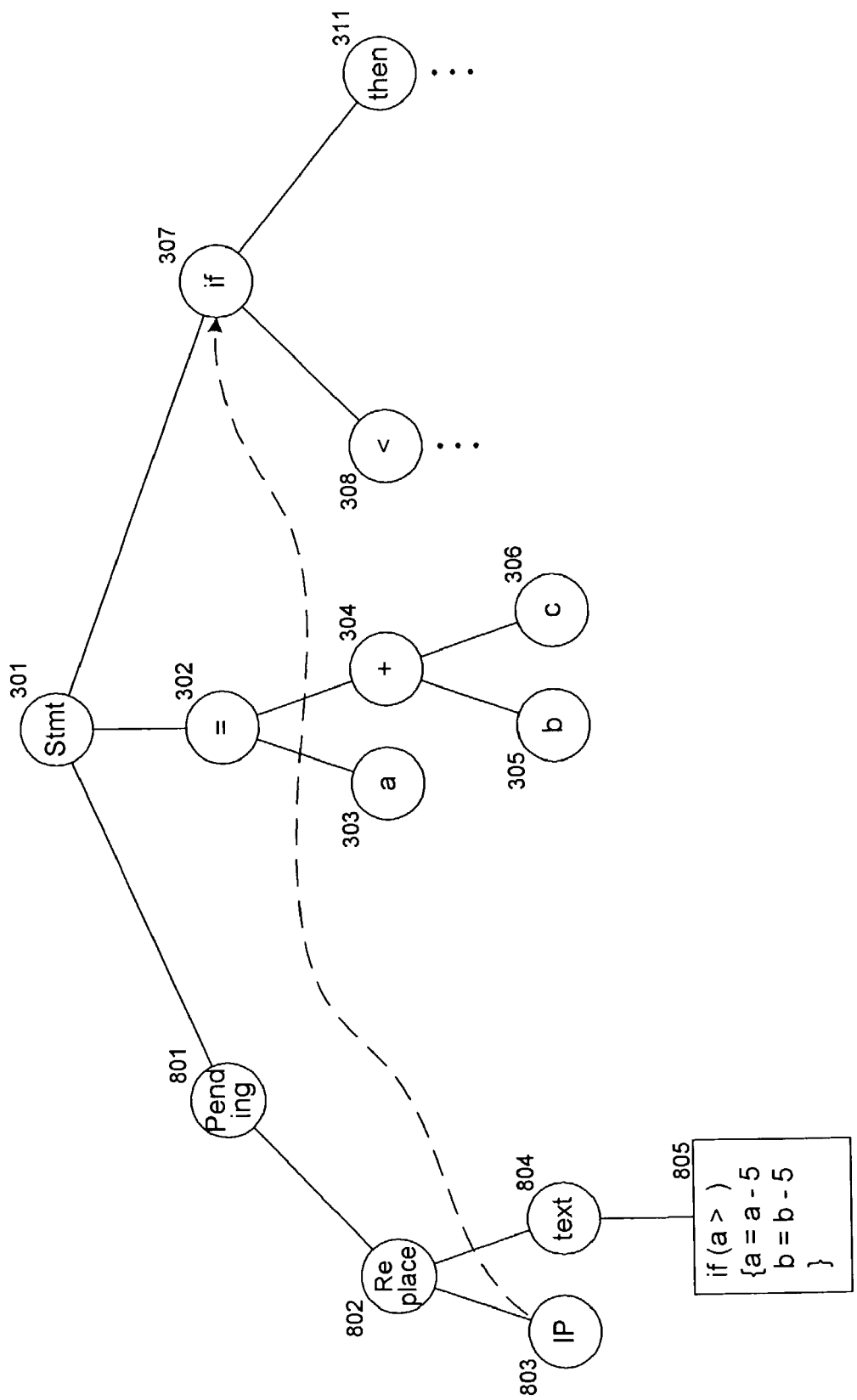
FIG. 8 is a diagram illustrating an example program tree with a pending change.

FIG. 7 is a block diagram illustrating a modification to example source code. In this example, the user has selected to modify the "if" statement. The change system has converted the "if" statement of the program tree into text, referred to as "liquefaction" or "unstructuring" of the structured representation. The change system then allows the user to modify the text using conventional non-structured text processing techniques. When the user has completed the modification, the change can be committed. The commitment can be signaled explicitly or implicitly. For example, the user can select a commit button to explicitly signal or select another statement to implicitly signal. In this case, since the condition portion of the "if" statement is not syntactically correct, the change is stored in the pending change list. FIG. 8 is a diagram illustrating an example program tree with a pending change. In this case, the unstructured text representing the modified text is stored in block 805 below the replace node 802. The source code itself contains nodes 301-321 to represent the entire unmodified source code.

Figure 9:
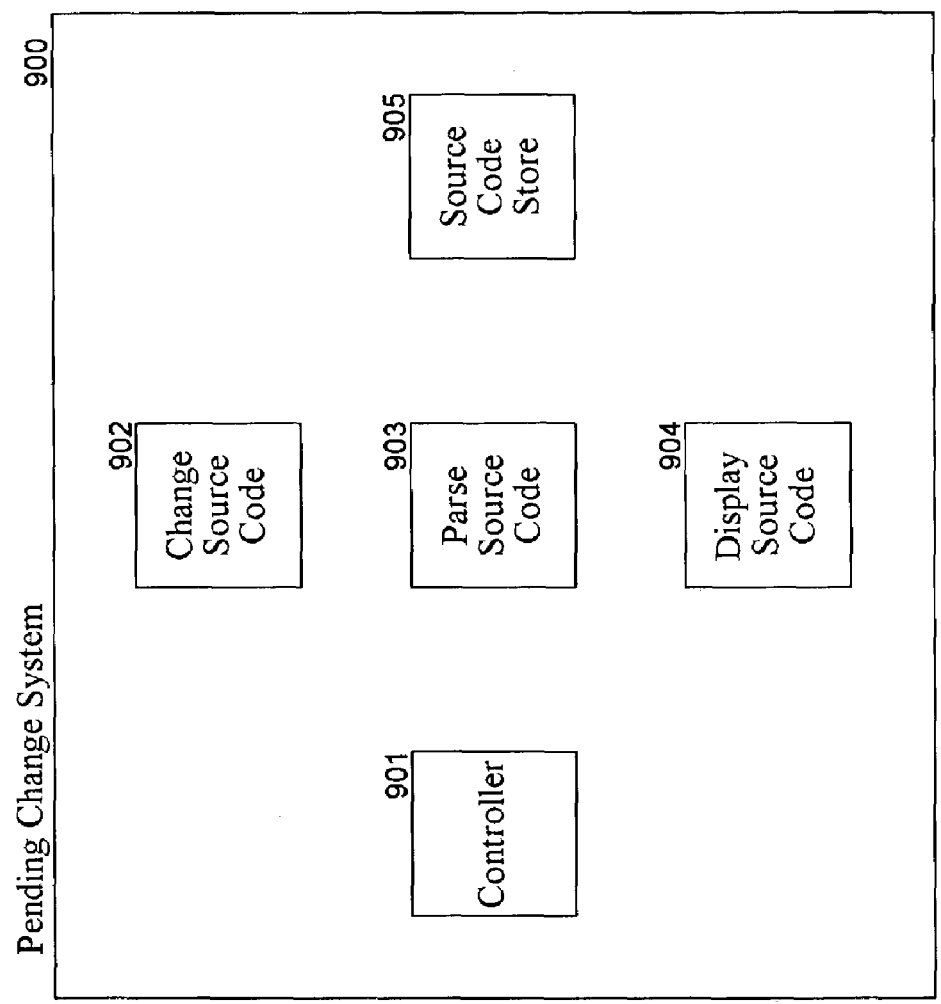
FIG. 9 is a block diagram illustrating components of a pending change system for source code in one embodiment.

FIG. 9 is a block diagram illustrating components of a pending change system for source code in one embodiment. The pending change system 900 includes controller 901, change source code component 902, parse source code component 903, display source code component 904, and source code store 905. The controller provides a user interface through which a user can create, store, and modify source code. The controller may implement traditional structured editor techniques in addition to techniques made available as a result of the pending change list. The change source code component is invoked to allow a user to change the source code and to save unrecognized changes in a pending change list. The parse source code component is invoked to perform syntactic analysis to determine whether source code is consistent with the syntax of the programming language. The display source code component is invoked to display source code along with any pending changes. The source code store stores the source code of the computer programs. The source code store may be a conventional storage device accessed through a conventional file system, or through a remote file system using a network protocol.

The pending change system may be implemented on a computer that may include a central processing unit, memory, input devices (e.g., keyboard and pointing devices), output devices (e.g., display devices), and storage devices (e.g., disk drives). The memory and storage devices are computer-readable media that may contain instructions that implement the pending change system. In addition, the data structures and message structures may be stored or transmitted via a data transmission medium, such as a signal on a communications link or network protocol. Various communications links may be used, such as the Internet, a local area network, a wide area network, or a point-to-point dial-up connection.

Figure 10:
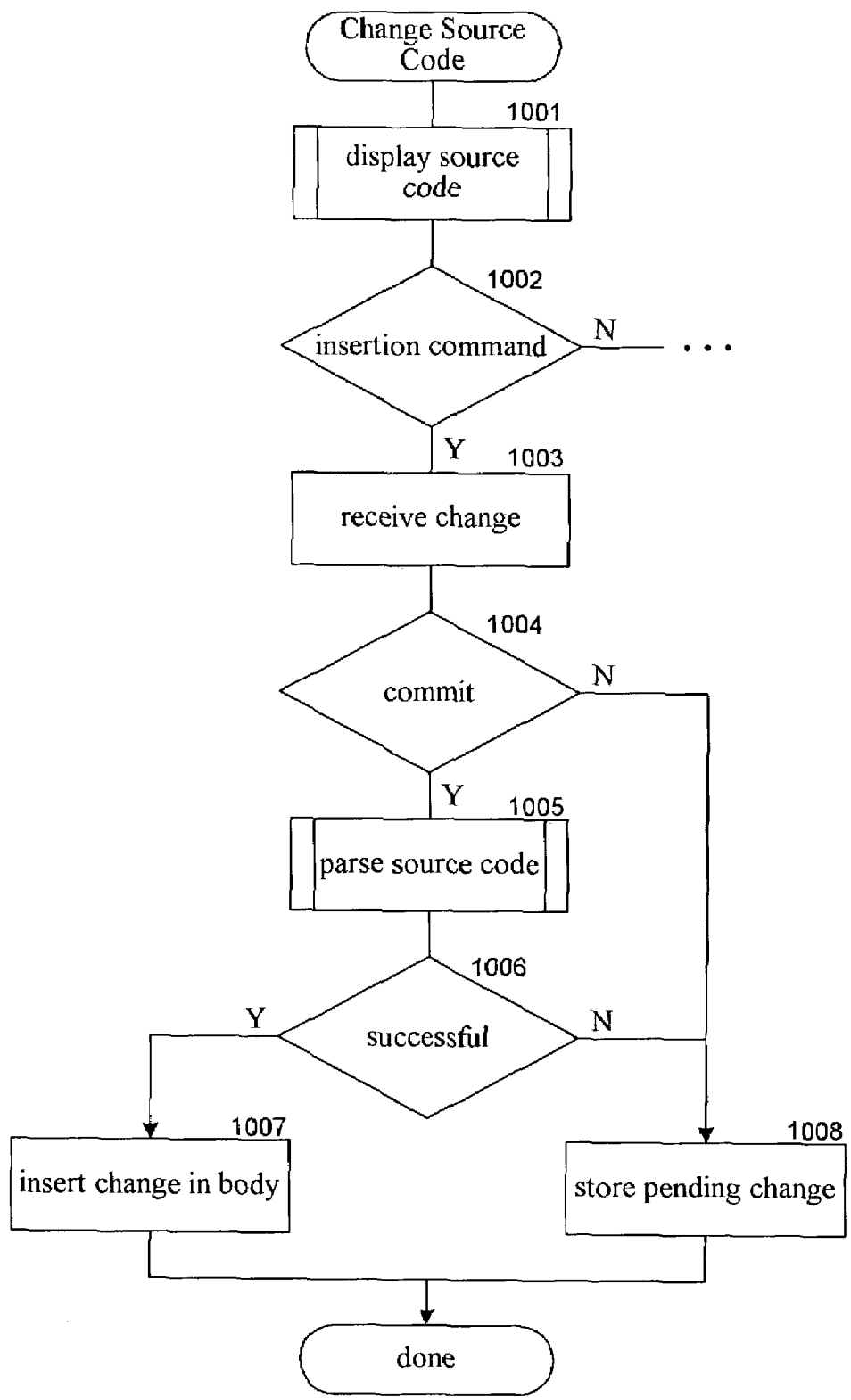
FIG. 10 is a flow diagram illustrating the change source code component of the change system in one embodiment.

FIG. 10 is a flow diagram illustrating the change source code component of the change system in one embodiment. The component displays the source code including indications of any pending changes, receives a change type command, and inputs the change. The component then determines whether the change is to be committed. If committed, then the component parses the source code with the change. If the source code with the change is syntactically correct, then the component effects the change. If the change is not syntactically correct or has not yet been committed, then the component stores the change in the pending change list associated with the source code. The component is passed a copy of the source code along with its associated pending change list. In block 1001, the component invokes the display source code component to display the source code along with the pending changes. In decision block 1002, if the user indicates to insert text, the component continues at block 1003, else the component continues to identify the type of change and to process accordingly as indicated by the ellipsis. A user can indicate the insertion command by selecting an insertion point and starting to enter text. A user can indicate the delete command by selecting a range of text and pressing the delete key on a keyboard. In block 1003, the component receives the new code as text to be inserted at the insertion point. In decision block 1004, if the user indicates to commit the change, then the component continues at block 1005, else the component continues at block 1008. In block 1005, the component parses the changed source code. In decision block 1006, if the changed source code was successfully parsed, then the component continues at block 1007, else the component continues at block 1008. In block 1007, the component updates the source code to reflect the insertion of the new code and completes. This updating may include changing the program tree representation of the source code that is stored in the source code store. In block 1008, the component stores the change in the pending change list associated with the source code and updates the source code store as appropriate and then completes.

Figure 11:
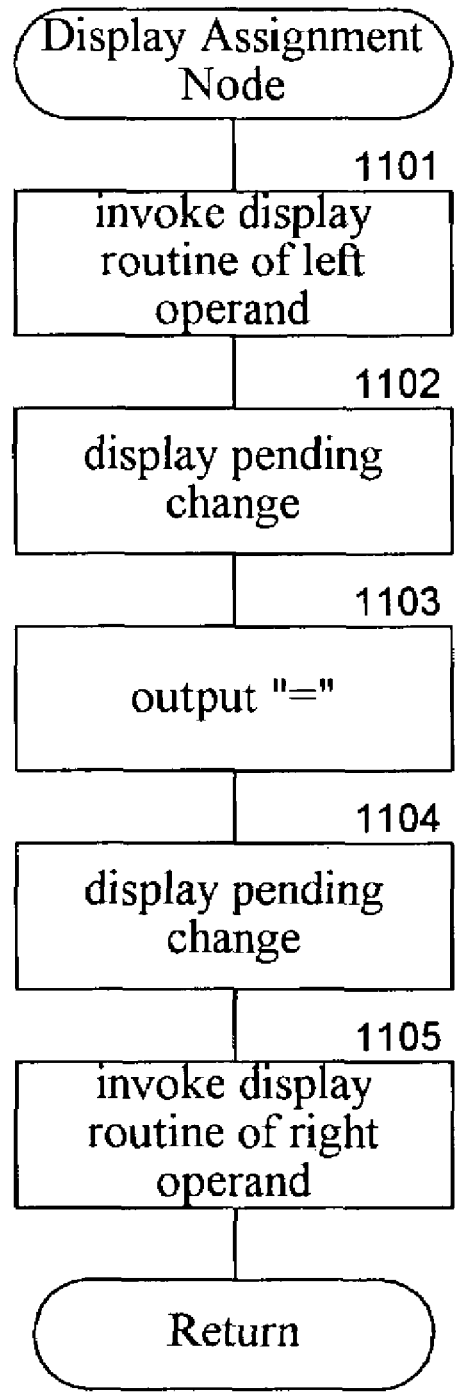
FIG. 11 is a flow diagram illustrating a display routine associated with an assignment operator in one embodiment.

FIG. 11 is a flow diagram illustrating a display routine associated with an assignment operator in one embodiment. Each operator type may have an associated display routine. To display the source code, the change system invokes the display routine associated with the root node of the program tree. That display routine effects the display of that node by invoking the display routines for each of its operand nodes, which in turn invokes the display routines of its operands. Each display routine may invoke a display pending change component to apply the effect of any pending changes relating to the display of the source code for that node. For example, if a pending change is to replace an assignment operator with a "for" loop, the routine would update the generated display representation accordingly. The routine may highlight (e.g., by displaying it within a box) the "for" loop to indicate that it is part of a pending change. In block 1101, the routine invokes the display routine for the left operand of the assignment operator. In block 1102, the routine displays the effect of any pending changes relating to the position immediately before the assignment operator. For example, the routine may display text corresponding to a pending insertion. In block 1103, the routine displays the assignment operator. In block 1104, the routine displays the effect of any pending changes relating to the position immediately after the assignment operator. For example, if the assignment operator is within the range of a pending delete, then the routine may suppress the display of the assignment operator. In block 1105, the routine invokes the display routine for the right operand of the assignment operator and then returns.

Although the present invention has been described in terms of a preferred embodiment, it is not intended that the invention be limited to these embodiments. Modifications within the spirit of the invention will be apparent to those skilled in the art. For example, one skilled in the art will appreciate that changes can be specified in many different ways, such as via a keyboard, a mouse, a handwriting tablet (e.g., using gestures), voice recognition, and so on. Also, the term "source code" includes not only text-based representations of a computer program, but also tree-based representations and any other way in which a computer program can be represented. The scope of the present invention is defined by the claims that follow.

I claim:

1. A method in a computer system for controlling the editing of a computer program, the method comprising:
   receiving a description of a change to be made at a designated location of the computer program;
   determining whether the change will result in the computer program becoming invalid;
   when it is determined that the change will result in the computer program becoming invalid, storing the description of the change and the designated location without changing the computer program, such that the computer program remains valid; and
   when displaying the computer program, displaying an indication of the change in association with the designated location.

2. The method of claim 1 wherein the stored description is an entry in a list of pending changes for the computer program.

3. The method of claim 2 wherein the entry contains a reference to a description of the change and a reference to the designated location.

4. The method of claim 1 wherein the computer program is represented as program tree.

5. The method of claim 1 wherein the change will result in the computer program having an invalid structure.

6. The method of claim 1 wherein the displayed indication of the change is the description of the change and receiving an indication of a modification to the change so that the modified change will result in the computer program becoming valid.

7. The method of claim 1 wherein when it is determined that the change will result in the computer program becoming valid, applying the change to the computer program.

8. The method of claim 1 wherein the description of the change and designated location is stored persistently.

9. The method of claim 1 wherein it is used with a structured editor.

10. A method in a computer system for editing a computer program, the method comprising:
    receiving an indication of an insertion point within the computer program;
    receiving from a user text to be inserted into the computer program at the insertion point;
    receiving from the user an indication to commit the insertion of the text into the computer program at the insertion point; and
    after receiving the indication to commit the insertion of the text
        determining whether the text when inserted at the insertion point will result in the computer program being valid;
        when it is determined that the computer program will be valid, modifying the computer program to reflect insertion of the text into the computer program at the insertion point; and
        when it is determined that the computer program will be invalid, storing an indication of the text and of the insertion point in association with the computer program, such that the computer program remains valid.

11. The method of claim 10 including when displaying the computer program and when the indication of the text and of the insertion point is stored in association with the computer program, displaying an indication of the text in association with the insertion point of the displayed computer program.

12. The method of claim 10 wherein the stored indication is an entry in a list of pending changes for the computer program.

13. The method of claim 10 wherein the computer program is represented as program tree.

14. The method of claim 10 wherein the insertion will result in the computer program having an invalid structure.

15. The method of claim 10 wherein the determining includes parsing the text.

16. The method of claim 10 wherein it is used with a structured editor.

17. A method in a computer system for tracking changes to a computer program, the method comprising:
    for each of a plurality of changes,
        receiving from a user an indication of the change to be made to the computer program; and
        before committing the change, storing an indication that the change is pending for the computer program, such that the computer program remains valid when applying the change would make the computer program invalid.

18. The method of claim 17 including when displaying the computer program, displaying an indication of each change near the location within the computer program where the change is to be made.

19. The method of claim 17 wherein the indication is stored in a pending change data structure.

20. The method of claim 17 including, after the change is committed, determining whether the computer program after the change is made will be valid.

21. The method of claim 20 including storing an indication that the change determined to be invalid is pending.

22. The method of claim 17 including:
    attempting to recognize the change; and
    when the change is recognized,
        editing the computer program in accordance with the change; and
        removing the stored indication that the change is pending for the computer program.

23. The method of claim 22 including:
    when the change is not recognized, maintaining the stored indication that the change is pending for the computer program.

24. The method of claim 17 wherein the change is to insert new code at an insertion point within the computer program.

25. The method of claim 24 wherein the new code is input in an unstructured manner.

26. The method of claim 17 wherein the change is to delete a portion of the computer program.

27. The method of claim 17 wherein the change is to modify a portion of the computer program.

28. The method of claim 17 wherein it is used in conjunction with a structured editor.

29. A computer-based method for changing data having a data model, the method comprising:
    receiving a change to make to the data;
    determining whether the change to the data will result in changed data that is consistent with the data model; and
    when it is determined that the change will result in the data not being consistent with the data model,
        leaving the data unchanged, such that the data model remains consistent; and
        storing in association with the data an indication that the change is pending so that processing of the data can factor in the pending change and so that a modification can be made that will result in the changed data being consistent with the data model.

30. The method of claim 29 wherein the modification is made to the change.

31. The method of claim 29 wherein the modification is made to the data.

32. The method of claim 29 wherein the data model specifies a grammar.

33. The method of claim 29 wherein the data model is defined by a schema.

34. The method of claim 29 wherein the data is an XML document.

35. The method of claim 34 wherein the data model is an XML schema.

36. The method of claim 29 wherein the data is stored in a database.

37. The method of claim 36 wherein the database includes a pending change table for storing pending changes.

38. The method of claim 37 wherein a pending change is a collection of table changes, where each table change identifies a table, an entry within the table, a field within the entry, and a value for the field.

39. The method of claim 37 wherein the data model is a database schema.

40. The method of claim 29 wherein the data is an UML model.

41. The method of claim 40 wherein the data model is UML notation.

42. The method of claim 40 wherein the data model is UML semantics.

43. The method of claim 29 wherein the change is indicated by a gesture.

44. The method of claim 29 wherein the data is a computer program.

45. The method of claim 44 wherein the computer program specified is a programming language with a grammar and wherein the data model is the grammar.

46. A computer-based method for changing data, the method comprising:
receiving a change to make to the data;
when the data as changed is to be committed,
recognizing the data as changed;
when the recognition is successful, modifying the data as indicated by the change; and
when the recognition is not successful, storing an indication that the change is pending, such that the data remains unmodified; and
when the data as changed is not be committed, storing an indication that the change is pending.

47. The method of claim 46 wherein when displaying the data and a change is pending, displaying an indication of the change in association with the data.

48. The method of claim 46 wherein the data is a computer program.

49. The method of claim 48 wherein the recognizing includes parsing the changed computer program.

50. The method of claim 46 wherein the data is a UML model.

51. The method of claim 50 wherein the recognizing includes determining whether the UML model as changed is a valid UML model.

52. The method of claim 46 where the change is indicated by a gesture.

53. The method of claim 46 wherein the data is an XML document.

54. The method of claim 53 wherein the recognizing includes determining whether the changed XML document is consistent with a schema.

55. The method of claim 46 wherein the recognizing includes determining whether the data as changed is consistent with a schema.

56. The method of claim 46 wherein the data is stored in a database.

57. The method of claim 56 wherein the database includes a pending change table for storing pending changes.

58. The method of claim 57 wherein the recognizing includes determining whether the pending change is consistent with a database schema.

59. A computer-based method in a structured editor for changing a computer program stored in a structured manner, the method comprising:
receiving in a non-structured manner text to be inserted into the computer program;
determining whether computer program with the received text inserted to would be syntactically correct;
when the received text has been committed for insertion,
when the computer program with the text inserted would be syntactically correct, inserting the text into the computer program; and
when the computer program with the text inserted would not be syntactically correct, storing an indication that text is to be inserted into the computer program, such that the computer program remains syntactically correct; and
when the received text is not yet committed for insertion, storing an indication that text is to be inserted into the computer program.

60. The method of claim 59 wherein the determining includes performing a lexical analysis of the computer program with the text inserted.

61. The method of claim 60 wherein the computer program stored in a structured manner includes an indication of the syntactic entities of the computer program.

62. The method of claim 59 wherein the computer program stored in a structured manner includes a syntax tree.

63. The method of claim 59 wherein the computer program stored in a structured manner includes program tree.

64. The method of claim 59 including:
receiving from a user a selection of a syntactic entity of the computer program;
providing text associated with the selected syntactic entity; and
allowing the user to change the provided text in a non-structured manner so that the changed text can be inserted into a structured representation of the computer program.

65. The method of claim 59 wherein the computer program is stored is additionally stored in a non-structured manner.

66. A computer-readable storage medium containing a data structure comprising:
a program tree representing a computer program, the program tree having nodes; and
a pending list indicating changes to be made to the computer program represented by the program tree, a change including a reference to a node of the program tree, such that changes that would make the computer program invalid are stored separately from the program tree.

67. A method in a computer system for changing a computer program, the method comprising:
providing a structured representation of the computer program;
receiving from a user a selection of a syntactic entity of the computer program;
providing text associated with the selected syntactic entity; and
allowing the user to change the provided text in a non-structured manner so that the changed text can be inserted into a structured representation of the computer program, such that the computer program remains syntactically correct.

68. The method of claim 67 including:
determining whether the computer program with the provided text inserted would be syntactically correct;
when the provided text has been committed for insertion,
when the computer program with the provided text inserted would be syntactically correct, inserting the provided text into the computer program; and
when the computer program with the provided text inserted would not be syntactically correct, storing an indication that the provided text is be inserted into the computer program, such that the computer program remains syntactically correct; and
when the provided text is not yet committed for insertion, storing an indication that the provided text is to be inserted into the computer program.

* * * * *